United States Patent [19]

Rhodes

[11] 4,110,476
[45] Aug. 29, 1978

[54] PREPARATION OF LIQUID AND FROZEN YOGURT PRODUCTS

[75] Inventor: Kenneth H. Rhodes, San Jose, Calif.

[73] Assignee: Johnson/Rhodes Cultured Foods, Inc., Calif.

[21] Appl. No.: 758,045

[22] Filed: Jan. 10, 1977

[51] Int. Cl.$^2$ .................. A23C 9/12; A23C 21/00; A23G 5/00
[52] U.S. Cl. .................. 426/41; 426/42; 426/43; 426/61; 426/524; 426/565; 426/583
[58] Field of Search .................. 426/34, 42, 41, 43, 426/583, 565, 61, 524

[56] References Cited

U.S. PATENT DOCUMENTS

| | | | |
|---|---|---|---|
| 1,710,133 | 4/1929 | Wintler | 426/43 |
| 2,119,599 | 6/1938 | Nordsiek | 426/43 |
| 2,124,820 | 7/1938 | Hellinger | 426/41 X |
| 2,449,140 | 9/1948 | Pollard et al. | 426/41 |
| 2,449,141 | 9/1948 | Pollard et al. | 426/43 X |
| 2,608,483 | 8/1952 | Hayes | 426/41 |
| 2,805,950 | 9/1957 | Evekson | 426/41 |
| 2,930,696 | 3/1960 | Rodgers et al. | 426/41 |
| 3,025,165 | 3/1962 | Metzger | 426/43 X |
| 3,048,490 | 8/1962 | Lundstedt | 426/41 |
| 3,269,842 | 8/1966 | Mayer et al. | 426/43 |
| 3,321,319 | 5/1967 | Heckenberg et al. | 426/42 X |
| 3,468,670 | 9/1969 | Nilsson | 426/43 X |
| 3,497,359 | 2/1970 | Peer | 426/61 |
| 3,535,117 | 10/1970 | Yamanaka et al. | 426/42 |
| 3,563,760 | 2/1971 | Kuwahara | 426/43 |
| 3,840,670 | 10/1974 | Holt | 426/41 |
| 3,852,158 | 12/1974 | Anderson et al. | 426/41 X |
| 3,900,572 | 8/1975 | Peer | 426/41 |
| 3,914,441 | 10/1975 | Finney et al. | 426/565 |
| 3,932,680 | 1/1976 | Egli et al. | 426/43 |
| 3,950,544 | 4/1976 | Fridman | 426/43 X |
| 3,998,700 | 12/1976 | Reinbold et al. | 426/43 X |

OTHER PUBLICATIONS

Horton, et al., Membrane Processing of Cheese Whey Reaches Commerical Scale, Food Technology, vol. 26, No. 2 1972, pp. 30-35.
Giles, M. T., Whey Processing and Utilization, Food Technology Review No. 19, Pollution Technology Review No. 15, 1974, (pp. 50 & 51).
Delaney, R. A. M. Composition Properties and Uses of Whey Protein Concentrates, Journal of the Society of Dairy Technology, vol. 29, No. 2, 1976 (pp. 91 & 96).
Kaleb, et al., Milk Gel Structure -V Microstructure of Yogurt as Related to the Heating of Milk, Milchwissenschaft, vol. 31, No. 7, 1976 (pp. 402-408).
Holsinger, et al., Whey Beverages: A Review J. Da. Sci., vol. 51, No. 8, 1974 (pp. 849-859).
Prodanski, P. G., Utilization of Proteins From Whey, Buttermilk and Skimmilk, Morochnaya Promyshlennost., vol. 30, No. 9, 1971 (pp. 44-45).

Primary Examiner—David M. Naff
Attorney, Agent, or Firm—Robert H. Eckhoff

[57] ABSTRACT

A liquid or frozen yogurt is prepared by combining sources of fat and milk derived solids with a relatively undenatured whey protein concentrate to form a mixture having no more than 2 parts casein to 1 part whey protein. The source of whey protein concentrate has all casein coagulating enzyme inactivated and the concentrate contains about 22 to 52% protein, 0.1 to 6% fat, 32 to 73% lactose and 3 to 11% ash. The mixture is maintained at a temperature sufficient to pasteurize and form a protein complex and the pasteurized mixture is fermented to produce the liquid yogurt which can be frozen.

19 Claims, No Drawings

PREPARATION OF LIQUID AND FROZEN YOGURT PRODUCTS

BACKGROUND OF THE INVENTION

This invention relates to liquid yogurt base and frozen yogurt mix and specifically to an improved base yielding a liquid yogurt which will remain drinkable and not thicken with age, will hold fruit particles in suspension, and will not develop objectionable off-flavors; an improved mix yielding a frozen yogurt with no casein precipitate, no bitter aftertaste, and a firm, heavy body heretofore unobtainable.

The processes for the preparation of the liquid yogurt base and the frozen yogurt mix utilize whey protein concentrate as a source of the whey proteins, lactalbumin and lactalglobumin. In the practice of the invention, the whey protein fraction of milk is increased beyond its normal occurring level to prevent casein, the major protein in milk, from forming heavy curd tension or curd-like precipitate during and after fermentation by lactic acid producing bacteria. The invention provides a means for the utilization of whey, a waste by-product of the dairy industry, the disposal of which has created severe environmental problems.

DESCRIPTION OF PRIOR ART

The term "yogurt" as used herein, refers to a cultured milk product produced by fermenting sources of butterfat and non-fat milk solids such as cream, low fat milk, skim milk, and the like in liquid or powder form with a yogurt culture producing lactic acid, commonly including bacilli classically identified as *Streptococcus thermophilus, Lactobacillus bulgaricus,* and *Lactobacillus acidophilus.* This invention also includes a yogurt-like cultured product utilizing sources of fat other than butterfat, such as vegetable and animal fats and sources of non-fat milk solids such as salts of casein or combinations of salts of casein.

Liquid yogurt is a product which is consumed by drinking rather than the use of a spoon. The product contains particles of fruit in suspension and will not thicken, develop a bitter aftertaste with age, nor will it develop a grain-like texture and will resist heat-shock during distribution. Frozen yogurt is a cultured product which is consumed in either hard frozen or in a soft frozen form as it flows from a dispensing freezer. A similar type of frozen yogurt mix is employed for both hard frozen and soft serve product, the only difference between the two being a higher total solids mix for the hard frozen product.

There are two common ways to manufacture yogurt. Preblended yogurt has the fruit and flavor homogenously dispersed throughout the product. Fruit-on-the-bottom yogurt has the fruit lying on the bottom of the cup so that when the cup is inverted, the product resembles an ice cream sundae. Both types utilize approximately the same composition, e.g. 0.5 to 6.0 percent butterfat, 8.0–14.0 percent non-fat milk solids, 0.0–8.0 percent sweetner in the base, 0.1–0.6 stabilizer, and 10.0–25.0 percent fruit preparation. The fruit preparation may contain fruit, flavor, color, stabilizer, acids, and preservatives.

These compositions are made up from such sources as milk, non-fat milk solids, cream, condensed skim milk, and the like. The composition is pasteurized and homogenized by high temperature short time (HTST) for 30 seconds at 180° or better. Homogenization pressures range from 1500 psi to 2500 psi. In some cases, vat pasteurization occurs for 15–30 minutes at 180° F. or higher and may also be employed after the HTST process. This heat treatment denatures the casein such that it will not agglomerate so readily and precipitate or form a "grainy" texture. This "grain-like" precipitate forms as the pH lowers or the acid content increases during the fermentation process in manufacturing yogurt.

The next step is to cool the composition to 110° F. and inoculate with a yogurt culture containing the typical yogurt bacteria Streptococcus thermophilus, Lactobacillus bulgaricus, and Lactobacillus acidophilus.

The fruit-on-the-bottom method utilizes the aforementioned inoculated composition and a fruit composition which has been injected into the bottom of a 8 oz. cup typically. The milk product composition is then filled on top of the fruit and incubated for 4 to 6 hours. The yogurt then "sets" or becomes a "pudding-like" consistency. The individual cups are then cooled to stop the fermentation process and shipped to the consumer.

The preblended yogurt is bulk fermented to the desired acid content and pH. When the correct acid content and flavor has developed, the composition is pumped through a cooler to stop fermentation. During this pumping process, the finished yogurt composition is also passed through a screw or pressure valve to "smooth out" the casein precipitate. This casein precipitate contributes to a rough mouth feel and bitter aftertaste.

Gelatin is used as the stabilizer of choice as its isoelectric point which approximates that of casein. This enables the yogurt composition to "set" firm at a pH of 4.6 or lower. The set enables the yogurt to entrap the fruit mixture and keep it from settling to the bottom of the cup.

After the yogurt has been cooled, it is blended with a fruit mixture containing fruit, sugars, flavors, stabilizers, acids, color, and preservatives. This fruit mixture is generally 12 to 25 percent of the final product. The yogurt fruit blend is then filled into packages.

Liquid yogurt has been made successfully by utilizing the blended yogurt process described previously. The heat process during pasteurization is generally more severe at a higher temperature to denature the casein, preventing it from agglomerating. The agglomeration of the casein causes a higher curd tension which results in a pudding-like or custard consistency. The thickening or "set" is due to the low solubility of calcium caseinate. As the lactic acid content increases during the yogurt fermentation process, the sodium ion attached to the casein is replaced by the calcium ion thus: Na caseinate ⇌ Ca caseinate.

The problems associated with the liquid yogurt process is that the resulting product is not uniform from batch to batch or from day to day. Stabilizers such as gelatin can be added, but they tend to cause the product to thicken with age. This results in lack of uniformity at the consumer level since yogurt normally must have a shelf life of 30 to 45 days to be economically marketed. Since the liquid yogurt displays a lack of uniformity with respect to curd tension, it also allows the fruit particles to settle on the bottom of the carton. Several manufacturers have employed the use of fruit purees to avoid this objectionable characteristic. However, the consumer prefers large particles of fruit in the finished product.

A new process for a liquid, drinkable yogurt has been recently employed. This process utilizes ultra-high temperature pasteurization in the range of 210°-230° F. for 5 to 15 seconds and vacuum cooling to 140°-160° F. for homogenization at 1500 psi on the first stage and 500 psi on the second stage and rapidly cooling to 106° F. to 114° F. for inoculation of the yogurt culture and incubation for 4 to 6 hours. The product is then blended with a fruit, sugar and acid mixture in the proportions of 15 to 25 percent fruit mixture to 75 to 85 percent yogurt mixture. This finished product is packaged and shipped to market.

This product entails careful monitoring of the finished product and adjustments must be made daily in the heat treatment to account for variations in the fluctuations in chemical composition of the milk supply.

Thus far, the yogurt process of the prior art still displays inconsistency in the finished product. The liquid yogurt will display "whey-off" or "free-liquid" occasionally. The casein will "grain out" or precipitate causing rough texture or sandiness. Accompanying this defect is a bitter or prolonged aftertaste. The product will also thicken at the surface if it displays gelation on the sidewalls of the package or if heat shock is experienced during distribution. Heat shock is quite common in modern day marketing channels. In fact, if severe heat shock or age is experienced, the liquid yogurt will set or become non-drinkable.

There are two common ways to manufacture frozen yogurt. One involves a two-step pasteurization with the second pasteurizing step occurring after culture fermentation. In some cases the yogurt mix is reinoculated to render it active in yogurt organisms. The other process, a so-called "one-step" process, involves fermenting the entire formulation after an initial pasteurizing step. However, a significant problem encountered in manufacturing good quality frozen yogurt by either of these processes is the undesirable precipitation of casein or milk protein when the pH during fermentation reaches 4.65, the isoelectric point of casein, resulting in a product with a curd-like precipitate, grainy texture and bitter aftertaste. Further handling associated with freezing, dispensing, packaging and distribution increases these unfavorable properties.

Typically, in a conventional two-step pasteurization process, milk is blended with other sources, if desired, of butterfat, non-fat milk solids, milk solids non-fat, sugar, stabilizer and emulsifier. "Non-fat milk solids" is defined as that portion of milk solids remaining after the removal of the butterfat, for example, skim milk, whereas "milk solids non-fat" refers to any solids derived from milk which contain no fat, such as lactose and whey. The blend is pasteurized, homogenized, inoculated with 2 to 6 weight percent of a yogurt producing culture and fermented to titratable acidity of 1.0 to 1.4 percent lactic acid. After fermentation the mixture must be agitated and broken and can be passed through a screen or pressure valve to "smooth out" the curd-like precipitate present in the product. Additional non-fat milk solids, milk solids non-fat, butterfat and sugars needed to reach the desired final formulation are added, and citrate or phosphate salts may be added to facilitate resolubilization and prevent graining of the casein. Emulsifiers and stabilizers may also be added at this point instead of as previously described. The mixture is then repasteurized, and may or may not be rehomogenized and reinoculated with active culture. The process is very time consuming, costly and requires great care and control. The second pasteurization renders the yogurt organisms inactive and even with subsequent reinoculation, the microorganism count does not equal that of normal unpasteurized yogurt. Thus, the resulting frozen yogurt has lost beneficial properties associated with a product in which a large population of microorganisms are present.

In the conventional single-step pasteurization process, the entire formulation is blended in the first step, then pasteurized, homogenized, cooled, inoculated with 2 to 6 percent by weight of a yogurt producing culture and incubated. Problems with the single step pasteurization process are encountered when the total solids are raised above 28 percent in which even growth of yogurt producing microorganisms is inhibited to the point where fermentation is arrested. In addition, the sugar solids have a dehydrating effect upon the casein upon aging, so that even if the mixture has been rehomogenized, the casein begins to precipitate unless citrate or phosphate salts are added to the incubated mixture. In order for citrate or phosphate salts to have the proper effect of solubilizing the casein particles, heat must be applied, and this heat defeats the nutritional benefits of yogurt. Upon further aging of the mix, a chalky texture develops with notable aftertaste, and this, in combination with the dryness produced by emulsifiers normally utilized, results in a product having a bitter aftertaste and chalk-like texture.

SUMMARY OF THE INVENTION

This invention provides a simplified and improved process for manufacturing liquid yogurt base and frozen yogurt mix. The liquid fruit flavored yogurt will remain stable, hold the fruit particles in suspension, and not develop a bitter aftertaste. The frozen yogurt mix will yield a frozen yogurt with heavy body, smooth texture, no bitter aftertaste and will have live organisms at a high population. The important aspect of this invention is the use of the whey proteins, lactalbumin and lactalglobumin, with whey protein concentrate as the source, to maintain solubilization of casein to prevent high curd tension development by agglomeration of the casein colloid particles. This phenomenon provides fluidity for the liquid yogurt, keeping the product drinkable over a long shelf life and preventing the development of a curd-like precipitate, resulting in grainy texture and bitter undesirable aftertaste in both the liquid yogurt and frozen yogurt. The past use of whey in dairy products such as ice cream, yogurt and the like has merely been as an economical source of milk solids non-fat. The novel property of whey protein to prevent precipitation of casein in cultured dairy products is recognized by the applicant as essential to the production of the applicant's liquid yogurt base and frozen yogurt mix with desired fluidity, texture, and taste which has not heretofore been recognized or utilized.

Liquid or drinkable yogurt, in contrast to the two varieties previously described as spoonable or pudding-like, cannot utilize stabilizers to ensure uniform product quality. Stabilizers cause thickening which is an undesirable property in liquid yogurt. It was also found that the addition of other dry milk products such as sodium caseinate and calcium caseinate did not prevent thickening and casein precipitation, and that only applicant's novel use of whey protein concentrate maintains the solubilization of casein and prevents the development of high curd-tension, yielding a liquid yogurt with the optimum quality control over viscosity, grainy texture, and predictable taste. Moreover, the combination of whey protein concentrate with the milk protein, casein results in liquid yogurt which has a higher protein efficiency ratio than a product made with milk fortified with non-fat milk solids in the same proportion.

Frozen yogurt, in contrast to the conventional non-frozen variety, has a higher percent total solids and sugar content, which results in casein precipitation, curd formation, and grainy texture. The undesirable properties are aggravated by subsequent processing such as freezing, packaging and heat shock during distribution. It was found that hydrocolloid gums which are effectively used as stabilizers in ice cream did not prevent curd formation in frozen yogurt, and some of them aggravated curd formation. It was also found that addition of other milk derived products such as sodium caseinate and calcium caseinate, did not prevent casein precipitation, and that only applicant's novel use of whey protein concentrate to maintain casein solubilization and prevent curd formation, yielded a frozen yogurt mix with optimum qualities of consistency, texture and taste. Moreover, a high protein efficiency ratio (PER) is obtained when whey protein concentrate is combined with casein, the major protein of milk, thus resulting in a highly nutritional yogurt product.

The use of whey protein concentrate, in addition to enabling a superior liquid yogurt using conventional sugar solids, also allows for the use of high sweetening sugars and monosaccharides which heretofore could not be used since their inclusion would reduce the specific gravity of the liquid yogurt such that it would not be able to hold the fruit in suspension. The resulting liquid yogurt has a higher protein content and a lower carbohydrate content that that of previously produced liquid yogurt.

The use of whey protein concentrate, in addition to enabling the formation of a superior frozen yogurt product using conventional sugar solids, also allows for the use of high sweetening sugars and monosaccharides which could not be used heretofore because their inclusion lowered the mix freeze point and resulted in weak consistency and a very wet product under commercial freezing conditions. The increased solubility of the whey protein concentrate versus casein at the pH of frozen yogurt mix raises the freeze point of the mix and allows it to be frozen, packaged, dispensed and distributed under commercial conditions. The use of whey protein concentrate and a monosaccharide such as fructose provides a frozen yogurt with increased protein content and lower carbohydrate content from that of previously produced frozen yogurt.

The invention also provides for the use of whey protein concentrate with sources of fat, other than butterfat, such as vegetable and animal fat, and sources of non-fat milk solids such as casein or combinations of salts of casein, and the like to produce liquid and frozen yogurt which has the properties described herein.

Whey is the part of milk left over after manufacturing cheese. It represents 90 percent on the average of the output of a cheese plant. It is the largest by-product of the dairy industry and worldwide output is many millions of tons annually. This represents a large source of high value protein which has been under utilized as a protein source and in many cases simply discarded. Disposal of whey as an effluent into waterways was heretofore the most economical means of disposal. This posed severe environmental problems due to the high biological oxygen demand for whey, making it a costly pollutant in sewage systems and waterways. This invention provides an important food use of whey protein concentrate, a food product which is commercially prepared from whey.

DETAILED DESCRIPTION

In the process of this invention, one preferred initial blend includes a mixture of milk, cream or other fat source and non-fat milk source, whey protein concentrate, microcrystalline cellulose, lecithin, and sugars, if desired. The frozen yogurt mix utilizes carboxymethylcellulose and citrate salts also. The blend or mixture is pasteurized, homogenized, and then cooled to a temperature of 105° F. to 115° F. and inoculated with a yogurt producing culture. The inoculated blend is incubated for a period of time sufficient to develop a titratable acidity of 1.0 to 1.35 percent lactic acid with a corresponding pH of 4.6 to 4.1. The blend is cooled immediately upon reaching the desired titratable acidity or pH.

The temperature to which the cooled liquid yogurt base is lowered is 60° F., but preferably to 50° F. The fruit mixture is then added with slow agitation until thoroughly blended. The fruit mixture should be slightly lower in temperature than that of the yogurt or syneresis will occur.

In the frozen yogurt mix preparation process, the sugars are vat pasteurized, cooled and added at a lower temperature than that of the cultured milk product blend.

The initial fermentable blend for liquid yogurt base should have a composition of butterfat in the range of 0.5 to 4.66 percent (all percentages are expressed on a final weight basis unless otherwise indicated), non-fat milk solids in the range of 0.1 to 12.0 percent, whey protein concentrate solids in the range of 4.0 to 12.0 percent, lecithin in the range of 0.01 to 0.3 percent, microcrystalline cellulose in the range of 0.07 to 0.4 percent, and sugars in the range of 0.0 to 12.0 percent. The total solids content should range from 16.0 to 24.0 percent for the initial fermentation blend. The preferred total solids content should be in the range of 20.0 to 22.0 percent. This level assures the most optimum quality control of the fermentation results without having to destroy the equilibrium between the yogurt and the fruit mixture at the final blending step in the process.

The final fruit flavored liquid yogurt should have a composition consisting of butterfat in the range of 0.38 to 3.5 percent butterfat (all percentages are expressed on total solids as a percentage of the final weight), non-fat milk solids in the range of 0.075 to 9.0 percent, whey protein concentrate solids in the range of 3.0 to 13.5 percent, lecithin in the range of 0.075 to 0.225 percent, microcrystalline cellulose in the range of 0.05 to 0.03 percent, sugars in the range of 6.0 to 14.0 percent, soluble fruit solids in the range of 0.64 to 2.4 percent, and acids, colors, flavors, and preservatives in the range of 0.05 to 2.5 percent. The optimum percent total solids of the final liquid yogurt should range from 22.0 to 28.0 percent depending upon the flavor. Flavors which are highly concentrated such as coffee or lemon would have a lower total solids content than flavors which are not so highly concentrated such as strawberry or peach.

Ingredients are selected to yield frozen yogurt mix composed of butterfat in the range of 0.5 to 8.0 percent (all percentages are denoted on a final mix weight basis unless otherwise indicated), non-fat milk solids in the range of 0.1 to 12.0 percent, whey protein concentrate in the range of 4.0 to 22.0 percent, lecithin in the range of 0.01 to 0.6 percent, microcrystalline cellulose in the range of 0.15 to 0.8 percent, carboxymethylcellulose in the range of 0.05 to 0.3 percent, citrate salt in the range of 0.0 to 0.6 percent, and sugar solids in the range of 6.0 to 22.0 percent. The total solids content should be in the range of about 22 to 47 percent to yield an acceptable product. The optimum percent total solids for a soft-serve mix is 30 to 34 percent, for hard pack, i.e., a mix to be hard frozen, 34 to 37 percent, and for a soft-serve shake mix, 26 to 28 percent. However, total solids may be altered such that a soft-serve mix can be as low as 24 percent, and hard pack mix can be as low as 26 percent.

The non-fat milk solids and butterfat may be derived from several sources including milk, cream, low fat milk, skim milk, concentrated skim milk, powdered skim milk, and the like. Formula adjustments must be made daily if the milk supply varies in the basic constituents so as to arrive at the product desired or as to meet legal minimum standards.

The stabilizers can be one or more of the compound carboxymethylcellulose and microcrystalline cellulose and can be present in the amount of from 0.05 to 0.9 percent by weight of the composition.

Microcrystalline cellulose may be excluded from the blend although this substance stabilizes the water of hydration. Microcrystalline cellulose will prevent shifts or allow for a slow change in the bound water of hydration equilibrium. If the microcrystalline cellulose gel were not present, the protein particles would lose their bound water of hydration readily. This phenomenon would lead to a decrease in the electric charge on each particle or micelle resulting in agglomeration and precipitation. The microcrystalline cellulose gel serves also to repel or stabilize the protein particles. The prevention of agglomeration of the protein particles, prevents coagulation and thickening, allowing the liquid yogurt base to remain liquid and drinkable. Other hydrophilic gums could be substituted, but they do not penetrate the hydrated protein particle nor will they allow for a change in equilibrium of the bound and free water in the same manner as afforded by microcrystalline cellulose. This substance also displays a unique thixotropic property in that the liquid yogurt will pour readily and yet set firm enough to suspend the fruit particles.

Microcrystalline cellulose may be excluded from the mix however, this compound stabilizes the water of hydration, inhibits ice crystal growth, and gives the resulting frozen yogurt longer shelf life. Other hydrophilic compounds may be substituted, but microcrystalline cellulose is the stabilizer of choice. In this sense the stabilizer provides a more rigid state of equilibrium between the bound water in the protein colloid and the free water in the mix.

I have also used lecithin, or more appropriately, the phospholipid complex commercially extracted from soybeans. Lecithin can also be extracted from other sources. Since the greatest portion of the phospholipid and choline complex has remained with the fat in the cheese making process, whey protein concentrate lacks the normal lecithin content found in milk. I have utilized lecithin for two purposes. The lecithin complexes with the whey protein and mono-valent ions to form a membrane around each fat globule. This membrane prevents agglomeration of the fat globules, thus stabilizing the emulsion and adding richness to the mouth feel. The membrane also provides a barrier against oxidation and rancidity development of the fat.

Lecithin also acts as an agent to wet or hydrate the whey protein absorption layer around the casein. This layer prevents agglomeration of the protein particles. Lecithin also aids the migration of monovalent ions upon the whey protein emulsoid layer surrounding the casein particle. The mono-valent ions increase the electric charge upon the colloid particles allowing for increased repulsion. The increased charge exhibited by each colloid particle will further prevent agglomeration of the protein particles.

The prevention of agglomeration of the protein particles will keep the liquid yogurt in a fluid state, prevent precipitation, prevent grain-like texture and bitter aftertaste in both the liquid and frozen yogurt products.

Citrate or phosphate salts will also improve the whey protein emulsoid properties by increasing the charge on the emulsoid particles, but can be eliminated from the formulation if the whey protein concentrate inherently has the correct level.

Lecithin is the emulsifier of choice for the frozen yogurt mix because it more closely approximates the phospholipids naturally occurring in milk. Other emulsifiers such as monoglycerides and mono- and diglyceride combinations, citrate or phosphate salts were also found to produce adequate dryness and melt-down resistence, thus producing an acceptable frozen yogurt.

Whey protein concentrate obtained commercially preferably should have the following composition: 22 to 52 percent protein (percent is denoted on a dry weight basis), 0.1 to 6.0 percent fat, 32 to 73 percent lactose or milk sugars which have been reduced, and 3.0 to 11.0 percent ash. The pH of the whey protein should be above 5.8 and preferably in the range of 6.1 to 6.3. The whey protein concentrate should be relatively undenatured and the heat treatment used to prepare the protein concentrate should remain as low as possible, preferably below 145° F. for short periods of time.

The whey protein concentrate should have all of the active casein coagulating enzyme inactivated. A simple test to determine if the enzyme is inactive is as follows: A 50/50 mixture of whey protein concentrate and non-fat milk solids in a 10 percent solution in water is held at 90° F. for two hours. If the solution coagulates, the whey protein concentrate is unacceptable for use in liquid yogurt base or frozen yogurt mix.

Satisfactory liquid and frozen yogurts can be prepared from high acid whey protein concentrate of the following composition: 22 to 52 percent protein (percent is denoted on a dry weight basis), 0.1 to 0.5 percent butterfat, 37 to 74 percent lactose and 3.0 to 11.0 percent ash. The pH of the whey protein concentrate may be as low as 4.4 with as much as 6 percent acid on a dry weight basis. However, adjustments must be made in the yogurt culture. For example, the percentage of Streptococcus thermophilus normally present as 50 percent of the yogurt culture should be reduced to the range of 25 to 35 percent of the culture to prevent the formation of a high acid, bitter flavored product.

As long as the whey protein concentrate remains relatively undenatured and thus soluble, it will not allow the casein to agglomerate and thicken. The resulting liquid yogurt base or frozen yogurt mix will remain liquid, will not exhibit a grainy texture, nor display a bitter after-taste. The fruit solids will also remain in suspension and not settle out to the bottom of the container of the liquid yogurt. Insofar as the applicant can determine, one apparent explanation for this phenomenon is that the combination of whey protein and casein lowers the isoelectric point of the combined protein to 3.6 or 3.7 and thus, as long as the pH remains above this pH range, the combined milk protein will remain soluble. A second possible explanation for this phenomenon seems to be that the lower molecular weight whey protein forms a hydrated protective shell around the casein particle thus preventing the casein from aggregating and becoming thick, forming a precipitate, and causing a chalk-like mouth feeling and creating a bitter after-taste.

Casein exists in milk as a colloid suspension with an average particle size of 40-60 microns. The caseinate particles are charged positively which keeps the particles apart and in suspension. Casein has an affinity for water, however, it is not a true emulsoid since it will precipitate when its isoelectric point has reached a pH of 4.65. The electric charges carried by the colloid particles are a result of (1) absorption of various ions and (2) electrolytic disassociation of the individual protein molecules within the colloid particle. The casein protein particle will react as a base or acid depending upon which side of the isoelectric point the pH of the yogurt is. The casein protein particle will react or combine with other colloids that are anodic or cationic depending upon pH. This reaction between casein and hydro-phillic gums or colloids is particularly important in liquid yogurt since the other colloids are normally used to provide body and, hence, suspension of the fruit particles. The reaction product of casein and other colloid gums will form heavy weight colloid particles which are large in size and, hence, will precipitate more readily. Hydrophillic gums reacting in this manner are sodium alginate and its derivitives, xanthane gum, and Locust Bean gum, etc. Pectin will react in this manner below the isoelectric point of casein. Guar gum will hydrolyze below a pH of 4.2.

In manufacturing normal yogurt mix, as the acid increases and the pH approaches 4.7, the casein particles lose their electric charge and begin to aggregate, resulting in a thick product. If additional gelatin is added with an isoelectric point approximating that of casein, the yogurt begins to thicken and form a very heavy body. As the pH lowers to 4.2, the casein begins to precipitate and whey-off occurs. The yogurt is then forced through a pressure valve affording low pressure homogenization and resolubilization of the casein. The yogurt is then mixed with fruit preparations and allowed to "reset" or thicken.

The molecular weight of the whey protein is below that of casein. The whey protein is a true emulsoid and the particle size, if it exists at all, approximates 5-10 microns in size. The very small emulsoid whey protein particles act as protective colloids by forming a protective shell by absorption on the larger casein particles. The protective shell or large membrane prevents aggregation even at the isoelectric point of casein or when the charge on the particle is reduced to its critical value. Since the ratio of casein to whey protein is normally 4:1 in milk, any significant change in this ratio will materially affect the ability of the casein to agglomerate. The casein particles are prevented from agglomerating by the introduction of whey protein recovered from cheese whey by changing the ratio of casein to whey protein to 2:1 or better so that more whey protein is present; the ratio of casein to whey protein in cows milk is about 4 to 1. Furthermore, since whey protein contains a much lower level of calcium ions, ferric ions, and other di- and tri-valent ions which have precipitated with the cheese in the cheese-making process, the protein fraction in the liquid base yogurt or frozen yogurt mix will not form insoluble salts with these ions.

It was further observed that certain whey proteins lack the correct amount of citric acid. This is because the original citric acid has been utilized by the micro-organisms in the original cheese-making process. Citric acid is utilized by the micro-organisms to form acetic acid and carbon dioxide. Acetic acid is the precursor of di-acetyl and bi-acetyl which are the most prominant flavor compounds associated with yogurt. The acetic acid is utilized by the lactobacillus organisms to create the flavor compounds noted.

The utilization of whey protein at high levels creates problems with some cultures. The whey protein is a new environment for the bacteria and this phenomenon slows down bacterial growth. Thus, the culture should be transferred a minimum of two times before it is used as an innoculum. The transfer media should be prepared with the same ratio of casein to whey protein as in the final liquid yogurt. The media transfer should be a 50/50 mixture of the final liquid yogurt composition and milk. The second transfer should contain 75%/25% mixture of final liquid yogurt to milk. The bulk culture can then be made from the final formula and used as the innoculum for the final liquid yogurt base or frozen yogurt mix.

As long as the whey protein concentrate remains relatively undenatured and thus soluble it will prevent the formation of a frozen yogurt with a curd-like precipitate. Whey protein also protects the casein from dehydration by the sugars thereby eliminating a chalky mouth feel and bitter aftertaste found in conventional single step processes.

This invention can also utilize whey protein solids as the only source of milk solids non-fat other than those contributed by the source of butterfat resulting in an extremely economical liquid yogurt. Such formula is feasible in the following ranges: butterfat in the range of 0.5 to 3.5 percent, non-fat milk solids in the range of 0.5 to 1.5 percent, whey protein solids in the range of 6.0 to 18.0 percent, microcrystalline cellulose in the range of 0.05 to 0.3 percent, lecithin in the range of 0.075 to 0.225 percent, and sugars in the range of 6.0 to 14.0 percent, and acids, colors, flavors, and preservatives in the range of 0.05 to 2.5 percent. The optimum total solids of the finished liquid yogurt should be in the range of 22.0 to 28.0 percent total solids depending upon the flavor of the final product.

This invention can also utilize whey protein concentrate as the only source of milk solids non-fat other than those contributed by the source of butterfat, resulting in an extremely economical frozen yogurt. Such a formula is feasible in the following ranges: butterfat in the range of 0.5 to 8.0 percent, non-fat milk solids in the range of 0.5 to 1.5 percent, whey protein concentrate in the range of 6.0 to 22.0 percent, microcrystalline cellulose in the range of 0.05 to 0.3 percent, lecithin in the range of 0.01 to 0.6 percent, citrate salts in the range of 0.0 to 0.6 percent, sugar solids in the range of 8.0 to 22.0 percent, and a total solids content of about 22 to 37 percent. The optimum total solids should be 32 to 34 percent for the frozen yogurt mix.

Pasteurization for liquid yogurt base may be carried out by the vat method heating to 165° F. for 30 minutes and homogenization in a two-stage homogenizer at 1500 psi in the first stage and 500 psi on the second stage. The preferred method of pasteurization is high temperature-short time by heating to 172° F. to 190° F. for 45 to 90 seconds, and homogenization at 1500 psi the first stage and 500 psi in the second stage.

Pasteurization for the frozen yogurt mix may be carried out by a conventional high temperature short time (HTST) process, i.e., heating for about 16 to 90 seconds at about 172° to 195° F. The mixture may also be processed by conventional vat pasteurization, i.e., heating at about 145° to 170° F. for about 15 to 45 minutes. Homogenization may be carried out by the conventional two stage process using a valve type homogenizer with a minimum of 2,000 psi on the first stage and 500 psi on the second stage.

The invention also contemplates the use of whey protein concentrate in combination with sources of fat, other than butterfat and sources of milk derived solids other than those described previously. Such sources of fat would include vegetable or animal fat while the sources of milk derived solids can include the salts of casein or combinations of casein salts, and the like. For example, a mixture of corn syrup and sodium caseinate resulting in a product resembling non-fat milk solids can be mixed with a source of fat and combined with whey protein concentrate to produce a frozen yogurt-like product by the process described.

The frozen yogurt mixes resulting from the previously described formulations are adapted to be blended with flavoring.

The liquid yogurt base and frozen yogurt mix and frozen yogurt process and product of this invention will now be described in more detail with reference to the following examples.

EXAMPLE 1

512 pounds of milk containing 3.56 percent butterfat and 8.58 percent non-fat milk solids, 26.5 pounds of cream containing 36.5 percent butterfat and 5.65 percent non-fat milk solids, 76.4 pounds of whey protein concentrate (sold under Cal Pro 31 by California Cooperative Creamery), 1.65 pounds of microcrystalline cellulose (sold under trademark Avicel by FMC Corporation, Code No. 581), 0.41 pounds of lecithin granules (sold by American Lecithin Company) were combined under agitation.

The mixture was pasteurized by the high temperature-short time method at 175° F. for 24 seconds and homogenized at 2000 psi, cooled to 112° F., and innoculated with direct-set culture. The mixture was fermented to a titratable acidity of 1.25 percent lactic acid. The pH was 4.3.

A mixture of 103.25 pounds Rio Oso sliced IQF peaches was diced and added to 105.6 pounds of 66.5% solids sucrose syrup. This mixture was heated to 180° F. with slow agitation. A 50 percent solution of citric acid was added until a pH of 3.9 was obtained. The mixture was cooled to 40° F. and added to the liquid yogurt mixture. The liquid yogurt-fruit mixture was cooled to 45° F. and packaged.

The procedure resulted in a fruit-flavored yogurt containing 3.5 percent butterfat, 14.35 percent milk solids non-fat, 5.5 percent non-fat milk solids, 8.85 percent whey protein solids, 0.2 percent microcrystalline cellulose, 0.05 percent lecithin, 8.5 percent sucrose sugar solids, 12.5 percent peach fruit contributing 2.0 percent solids.

The finished liquid fruit-flavored yogurt exhibited no whey-off after thirty days storage. The individual fruit particles remained in suspension. There was no thickening upon storage nor an apparent change in viscosity. The liquid yogurt did not exhibit grainy texture nor did it have a bitter aftertaste.

EXAMPLE 2

394 pounds of milk containing 3.5 percent butterfat and 8.59 percent non-fat milk solids, 152.5 pounds of skim milk containing 8.9 percent non-fat milk solids, 57 pounds of whey protein concentrate containing 1.3 percent butterfat and 95.7 milk solids non-fat (sold under Cal Pro 31 by California Cooperative Creamery), 2.18 pounds of microcrystalline cellulose (sold by FMC Corporation under the trade mark Avicel code number 581), and 0.36 pounds of powdered lecithin (sold by American Lecithin Company) were blended together.

The mixture was pasteurized by the high temperature-short time (HTST) process at 175° F. for 24 seconds and homogenized at 2000 psi. The mixture was cooled to 114° F. and innoculated at a 3 percent level with a commercial yogurt culture available from Dairy Products Laboratory. The mixture was fermented to a titratable acidity of 1.33 and the corresponding pH was 4.2. The mixture was immediately cooled to 55° F. and mixed with prepared fruits according to each of the following sub-examples 2A through 2F.

Example 2A 3.3 pounds of fructose and 8.7 pounds of instant quick freeze strawberry pieces containing 0.87 pounds of soluble fruit solids were combined. The mixture was heated to 180° F. and held for 5 minutes. Enough 50 percent citric acid solution was added to bring the pH to 3.9. The mixture was cooled to 40° F. and added to 60.6 pounds of liquid yogurt base.

The finished liquid strawberry fruit-flavored yogurt was stored for 30 days. The product needed more strawberry flavor which could be added via a concentrated strawberry juice. The fruit particles remained firm and in suspension for the 30 days. There was no thickening upon storage nor apparent change in viscosity. The liquid yogurt did not exhibit a grainy texture nor was there a detectible after-tase.

The finished strawberry flavored liquid yogurt contained 2.0 percent butterfat, 14.0 percent milk solids non-fat, 0.3 percent microcrystalline cellulose, 0.05 percent lecithin, 4.5 percent fructose sugar solids, 12.0 percent strawberry fruit contributing 0.87 pounds soluble fruit solids.

EXAMPLE 2B 3.3 pounds of fructose and 8.7 pounds of instant quick frozen diced peaches were combined. The mixture was heated to 180° F. and held for 5 minutes. Enough 50 percent citric acid solution was added to lower the pH to 3.9. The mixture was cooled to 40° F. and added to 60.6 pounds of liquid yogurt base prepared as in Example 1.

The finished liquid peach flavored liquid yogurt was stored for 30 days and observed. The product was rated as having enough peach identity. The fruit particles remained firm and in suspension. There was no thickening upon storage nor apparent change in viscosity. The liquid yogurt did not exhibit a grainy texture nor was there a detectible after-taste.

The finished peach flavored liquid yogurt contained 2.0 percent butterfat, 14.0 percent milk solids non-fat, 0.3 percent microcrystalline cellulose, 0.05 percent lecithin, 4.5 percent fructose sugar solids, 12.0 percent peach fruit contributing 1.39 pounds of soluble fruit solids.

EXAMPLE 2C 3.3 pounds of fructose and 8.7 pounds of crushed pineapple were combined and heated to 180° F. Enough 50 percent citric acid solution was added to lower the pH to 3.9. The mixture was cooled to 40° F. and added to 60.6 pounds of liquid yogurt base.

The finished liquid pineapple flavored liquid yogurt exhibited no whey-off after 30 days storage. The product needed additionally flavor identity which could be solved by the addition of concentrated pineapple juice. The fruit particles remained firm and in suspension. There was a slight change in viscosity as the product appeared to thin-out. There was no detectible after-taste nor did the liquid yogurt exhibit a grain-like texture.

The finished pineapple flavored yogurt contained 2.0 percent butterfat, 14.0 percent milk solids non-fat, 0.3 percent microcrystalline cellulose, 0.05 percent lecithin, 4.5 percent fructose sugar solids, 12.0 percent pineapple fruit contributing 1.48 pounds fruit solids.

EXAMPLE 2D 3.3 pounds of fructose and 8.7 pounds of instant quick frozen boysenberries were combined and heated to 180° F. Enough 50 percent citric acid solution was added to lower the pH to 3.9. The mixture was cooled to 40° F. and added to 60.6 pounds of liquid yogurt base.

The finished liquid boysenberry flavored fruit yogurt was stored for thirty days. The product did not exhibit thickening upon age nor was there an apparent change in viscosity. The fruit particles could have remained firmer and there was slight settling to the bottom of the container. There was no grainy texture nor apparent bitter after-taste.

The finished boysenberry fruit flavored yogurt contained 2.0 percent butterfat, 14.0 percent milk solids non-fat, 0.03 percent microcrystalline cellulose, 0.05 percent lecithin, 4.5 percent fructose sugar solids, and 12.0 percent boysenberry fruit contributing 1.22 pounds of soluble fruit solids.

EXAMPLE 2E 3.3 pounds of fructose and 8.7 pounds of instant quick frozen blueberries were combined and heated to 180° F. Enough 50 percent citric acid solution was added to lower the pH to 3.9. The mixture was cooled to 40° F. and added to 60.6 pounds of liquid yogurt base.

The finished liquid blueberry flavored fruit yogurt was stored for thirty days. The product did not exhibit thickening upon age nor was there an apparent change in viscosity. The particles remained firm and there was no settling to the bottom of the container. There was no grainy texture nor apparent bitter after-taste.

The finished blueberry fruit flavored yogurt contained 2.0 percent butterfat, 14.0 percent milk solids non-fat, 0.3 percent microcrystalline, cellulose, 0.05 percent lecithin, 4.5 percent fructose sugar solids, and 12.0 percent blueberry fruit contributing 1.31 pounds of soluble fruit solids.

EXAMPLE 2F 3.3 pounds of fructose and 8.7 pounds of instant quick frozen red sour pitted cherries were combined and heated to 180° F. Enough 50 percent citric acid solution was added to lower the pH to 3.9. The mixture was cooled to 40° F. and added to 60.6 pounds of liquid yogurt base.

The finished liquid cherry flavored fruit yogurt was stored for thirty days. The product did not exhibit thickening upon age nor was there an apparent change in viscosity. The fruit particles remained firm and there was slight settling of the fruit particles to the bottom of the container. There was no grainy texture nor apparent after-taste.

The finished liquid cherry flavored yogurt contained 2.0 percent butterfat, 14.0 percent milk solids non-fat, 0.3 percent microcrystalline cellulose, 0.05 percent lecithin, 4.5 percent fructose sugar solids, and 12.0 percent cherry fruit contributing 1.22 pounds of soluble fruit solids.

EXAMPLE 3

336 pounds of 3.6 percent butterfat and 8.48 percent non-fat milk solids, 58 pounds of skim milk containing 8.8 percent non-fat milk solids, 69 pounds of whey protein concentrate (Cal Pro 31 - California Cooperative Creamery) containing 32.9 percent protein, 1.3 percent butterfat, 56.4 percent lactose, and 6.6 percent ash), 0.32 pounds lecithin (Lecithin Granules 2F American Lecithin Company), 1.3 pounds microcrystalline cellulose (sold by FMC Corporation under the trademark Avicel Code 581), were combined together.

The mixture was vat pasteurized at 165° F. for 30 minutes, homogenized at 1500 psi on the first stage and 500 psi on the second stage, cooled to 112° F. and innoculated with 14.3 pounds of yogurt culture. The mixture was incubated for sufficient time to develop 1.33 percent lactic acid and a pH of 4.1. The mixture was cooled to 50° F. and mixed with the fruit mixture.

77.75 pounds of 70 percent sucrose and 30 percent corn syrup - 36 dextrose equivalent and 90.75 pounds of instant quick frozen raspberries, and 0.32 pounds of carboxymethyl cellulose were mixed together. The carboxymethyl cellulose was allowed to hydrate for 15 minutes. The fruit mixture was heated to 180° F. Enough 50 percent citric acid solution was added to lower the pH to 3.9. 1.5 pounds of Naarden raspberry flavor with other natural flavors was added when the mixture reached 110° F. The mixture was cooled to 40° F. and blended into the liquid yogurt base under slow agitation.

The finished raspberry liquid yogurt was stored for 30 days. The product displayed a heavy raspberry identity. The fruit particles remained very firm and did not settle to the bottom of the container. There was slight thickening upon storage, but it was not deemed objectionable. The yogurt did not exhibit a grainy texture nor was there a detectable aftertaste.

EXAMPLE 4

501.5 pounds of milk containing 3.8 percent butterfat and 8.56 percent non-fat milk solids; 197.1 pounds of skim milk containing 8.9 percent non-fat milk solids; 118.7 pounds of whey protein concentrate (sold under the trademark CAL PRO 31, by California Cooperatives) containing 32.9 percent protein, 1.3 percent butterfat, 56.4 percent lactose, and 6.6 percent ash; 3.74 pounds of microcrystalline cellulose (sold under the trademark AVICEL by FMC Corporation, Code No. 591); 1.1 pounds of carboxymethylcellulose (available as 7HOF from Hercules Chemical); 0.65 pounds of lecithin (available as CENTROLEX F from Central Soya Company were combined.

The mixture was pasteurized by the VAT process at 165 for 20 minutes, homogenized on a two state homogenizer with 2,000 psi on the first stage and 500 psi on the second stage, cooled to 110° F., and innoculated with a yogurt culture and fermented to a titratable acidity of 1.31 percent (pH 4.4).

84.2 pounds of fructose sugar solids and 28 pounds of water which had been previously vat pasteurized, by heating to 165° F. and cooling to 60° F. were added to the above and the resulting mixture was cooled to 40° F.

The product obtained was a soft-serve frozen yogurt mix having 2.2 percent butterfat, 6.47 percent non-fat milk solids, 12.15 percent whey protein milk solids non-fat, 0.40 percent microcrystalline cellulose, 0.12 percent carboxymethyl cellulose, 0.07 percent lecithin, 9.0 percent fructose sugar solids, and 31.0 percent total solids.

The resulting product from freezing 58 oz. of the above mix with 6 oz. of flavoring exhibited excellent taste, had a desirably "cold eat," and a smooth and creamy consistency with no grainy texture of ice crystal formation. It had a freezing point of 17° F. which is optimum for dispensing a soft serve product and extruded with an excellent firm texture.

EXAMPLE 5

370 pounds of milk having 3.8 percent butterfat and 8.6 percent non-fat milk solids; 406 pounds of skim milk containing 8.8 percent non-fat milk solids; 73.36 pounds of whey protein concentrate (CAL PRO, California Cooperatives) containing 32.9 percent protein, 1.3 percent butterfat, 56.4 percent lactose, and 6.6 percent ash; 2.6 pounds of microcrystalline cellulose (AVICEL, FMC Corporation); 0.7 pounds carboxymethyl cellulose (7HOF, Hercules Chemical); and 1.0 pounds of lecithin (Powdered Lecithin Granules, American Lecithin Company) were combined.

The mixture was pasteurized by the VAT process at 165° F. for 20 minutes, homogenized on a two stage homogenizer with 2,000 psi on the first stage and 500 psi on the second stage, cooled at 110° F., innoculated with 17 pounds yogurt culture, and incubated to a titratable acidity of 1.35 percent (pH 4.4).

65.8 pounds of high conversion corn syrup (40 percent fructose) having 52.6 pounds of sugar solids and 26.3 pounds of fructose solids and 15 pounds of water which was previously vat pasteurized, heated to 165° F. and cooled to 50° F., were added, and the mixture cooled to 40° F.

The resulting product was a soft serve frozen yogurt mix with a final formulation of 2.06 percent butterfat, 2.35 percent non-fat milk solids, 11.15 percent whey protein milk solids non-fat, 0.4 percent microcrystalline cellulose, 0.1 percent carboxymethylcellulose, 0.075 percent lecithin, 12.0 percent sugar solids of which 8.0 percent was high conversion corn syrup solids and 4 percent was pure fructose solids, and 32.1 percent total solids.

The resulting product from freezing 58 oz. of the above mix with 6 oz. of flavoring exhibited excellent taste, had a desirable "cold eat", and a smooth and creamy consistency with no grainy texture or ice crystal formulation. It had a freeze point of 18° F. which is optimum for dispensing a soft serve product and extruded with a firm and dry body.

EXAMPLE 6

371.5 pounds of milk containing 3.4 percent butterfat and 8.8 percent non-fat milk solids; 68 pounds of skim milk containing 8.8 percent non-fat milk solids; 43.5 pounds of whey protein concentrate (sold under the trademark CAL PRO 31 by California Cooperative) containing 32.9 percent protein, 1.3 percent butterfat, 56.4 percent lactose and 6.6 percent ash; 2.64 pounds of micrycrystalline cellulose (AVICEL, FMC Corporation, Code No. 591); 0.66 pounds of carboxymethyl cellulose (7HOF, Hercules Chemical); 0.5 pounds of lecithin (sold by American Lecithin Company) were combined.

The mixture was pasteurized by the VAT process by heating at 165° F. for 20 minutes and homogenized on a two stage homogenizer with 2,000 psi on the first stage and 500 psi on the second stage. The mixture was cooled to 112° F., innoculated with 17 pounds of a yogurt producing culture (sold under the DAIRY LABS trademark, by Dairy Products Laboratory), and fermented to titratable acidity of 1.33.

172.3 pounds to 70 percent sucrose, 30 percent corn syrup, 36 dextrose equivalent having 122 pounds of sugar solids which were previously vat pasteurized, heated to 165° F. and cooled to 60° F. were added and the mixture cooled to 45° F.

The frozen yogurt mix obtained had a final composition of 2.0 percent butterfat, 5.7 percent non-fat milk solids, 6.31 percent whey protein milk solids non-fat, 0.4 percent microcrystalline cellulose, 0.1 percent carboxymethylcellulose, 0.075 percent lecithin, 18.5 percent sugar solids and 33.05 percent total solids.

The resulting product from freezing 58 oz. of the above mix with 6 oz. of flavoring had a freezing point of 18° F., which is optimum for dispensed soft serve product. The frozen yogurt had a desirable heavy texture and mouth feel and "cold eat". When dispensed it set up with a firm, stiff body.

It is to be understood that the claims appended hereto are intended to cover all changes and modifications of the examples herein chosen for purposes of disclosure which do not depart from the spirit and scope of the invention.

I claim:

1. A process for the preparation of a liquid yogurt containing a high population of live organisms comprising the steps of:
    a. combining sources of fat and milk derived solids with relatively undenatured whey protein concentrate to form a mixture in the ratio of no more than 2 parts casein to 1 part whey protein, the source of whey protein being whey protein concentrate having all of the casein coagulant enzyme inactivated, the whey protein concentrate having from 22 to 52% protein, 0.1 to 6% fat, 32 to 73% of the material selected from the group consisting of lactose and reduced milk sugars, and from 3 to 11% ash, all percentages being on a dry weight basis;
    b. maintaining said mixture at a temperature to accomplish pasteurization and form a protein complex;
    c. thereafter cooling said mixture to an optimum fermentation temperature;
    d. innoculating said mixture after said cooling with a yogurt culture producing lactic acid; and
    e. fermenting said mixture after said innoculation sufficiently to develop a titratable acidity and cooling to arrest fermentation upon the mixture reaching the desired acidity to produce said liquid yogurt.

2. The process of claim 1 wherein the mixture contains butterfat in the range of 0.5 to 4.66%, non-fat milk solids in the range of 0.1 to 12%, and relatively undenatured whey protein concentrate in the range of 4 to 12%.

3. The process of claim 1 wherein the mixture contains butterfat in the range of 0.5 to 8.0, non-fat milk solids in the range of 0.1 to 12%, and relatively undenatured whey protein concentrate in the range of 4 to 22%.

4. A process for the preparation of a liquid yogurt mix containing a high population of live organisms from the mixture formed in accordance with claim 1 and which includes the further steps of:
   a. pasteurizing by heat and agitation at least one member of the group consisting of sugar and fruit;
   b. cooling and adding said member to the mixture of claim 1 from Step e. to provide a liquid yogurt having butterfat in the range of 0.5 to 8.0 percent, non-fat milk solids in the range of 0.1 to 12 percent and whey protein concentrate solids in the range of 4 to 22 percent; and
   c. further cooling the liquid yogurt from Step b.

5. A process as in claim 4 wherein the liquid yogurt from Step b. contains butterfat in the range of 0.38 to 3.5 percent, non-fat milk solids in the range of 0.075 to 9.0 percent, and relatively undenatured whey protein concentrate in the range of 3.0 to 13.5 percent.

6. The process of claim 4 wherein the sugar is a high sweetening monosaccharide.

7. The process of claim 5 wherein the sugar is a high sweetening monosaccharide.

8. A process as in claim 1 wherein following Step e. the product is subjected to a low temperature sufficient to produce a frozen product.

9. A process as in claim 5 wherein the product is subjected to a low temperature sufficient to produce a frozen product.

10. The process of claim 1 wherein the mixture directly after pasteurization contains sugar.

11. The process of claim 7 wherein the product is subjected to a low temperature sufficient to produce a frozen product.

12. The product resulting from the practice of the process of claim 1.

13. The product resulting from the practice of the process of claim 4.

14. The product resulting from the practice of the process of claim 10.

15. The product resulting from the practice of the process of claim 8.

16. The product resulting from the practice of the process of claim 9.

17. The product produced by the process of claim 6.

18. The product produced by the process of claim 7.

19. The product produced by the process of claim 11.

* * * * *